(12) United States Patent
Kim et al.

(10) Patent No.: US 11,419,030 B2
(45) Date of Patent: Aug. 16, 2022

(54) METHOD AND APPARATUS FOR HANDLING A FREQUENCY PRIORITY BASED ON A SERVICE IN WIRELESS COMMUNICATION SYSTEM

(71) Applicant: LG ELECTRONICS INC., Seoul (KR)

(72) Inventors: Sangwon Kim, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/278,987

(22) PCT Filed: Nov. 28, 2019

(86) PCT No.: PCT/KR2019/016593
§ 371 (c)(1),
(2) Date: Mar. 23, 2021

(87) PCT Pub. No.: WO2020/111823
PCT Pub. Date: Jun. 4, 2020

(65) Prior Publication Data
US 2022/0038981 A1    Feb. 3, 2022

(30) Foreign Application Priority Data
Nov. 30, 2018    (KR) .................. 10-2018-0151864

(51) Int. Cl.
*H04W 36/24*    (2009.01)
*H04W 68/00*    (2009.01)

(52) U.S. Cl.
CPC .......... *H04W 36/24* (2013.01); *H04W 68/005* (2013.01)

(58) Field of Classification Search
CPC ............... H04W 36/24; H04W 68/005; H04W 36/0022; H04W 48/20
USPC ........... 370/331; 455/426.1, 435.1–444, 458, 455/515
See application file for complete search history.

(56) References Cited

U.S. PATENT DOCUMENTS

| 2012/0322504 | A1* | 12/2012 | Chou ............... H04W 48/18 455/558 |
| 2014/0003390 | A1 | 1/2014 | Gholmieh et al. |
| 2015/0223126 | A1 | 8/2015 | Jung et al. |
| 2015/0351011 | A1 | 12/2015 | Shukla et al. |
| 2015/0373552 | A1* | 12/2015 | Jha ................. H04W 48/20 370/331 |

(Continued)

OTHER PUBLICATIONS

PCT International Application No. PCT/KR2019/016593, International Search Report dated Mar. 5, 2020, 2 pages.

(Continued)

*Primary Examiner* — Michael Y Mapa
(74) *Attorney, Agent, or Firm* — Lee Hong Degerman Kang Waimey

(57) ABSTRACT

A method and apparatus for handling a frequency priority based on a service in a wireless communication system is provided. The wireless device camps on a serving cell operated on a first frequency. The wireless device receives, from the serving cell, a paging including an information related to a service. The wireless device prioritizes or de-prioritizes the first frequency based on the information. The wireless device performs cell reselection based on a priority of the first frequency.

8 Claims, 13 Drawing Sheets

(56) References Cited

U.S. PATENT DOCUMENTS

| | | |
|---|---|---|
| 2016/0007260 A1 | 1/2016 | Abraham et al. |
| 2018/0192365 A1* | 7/2018 | Feng ................... H04W 48/20 |
| 2018/0249367 A1* | 8/2018 | Rosa ................... H04W 28/12 |
| 2021/0195405 A1* | 6/2021 | Gurumoorthy ....... H04W 48/12 |

OTHER PUBLICATIONS

3rd Generation Partnership Project (3GPP), "Technical Specification Group Radio Access Network; NR; Radio Resource Control (RRC) protocol specification (Release 15)," Section 5.3.2 of 3GPP TS 38.331 V15.3.0, Sep. 2018, 445 pages.

3rd Generation Partnership Project (3GPP), "Technical Specification Group Radio Access Network; NR; User Equipment (UE) procedures in Idle mode and RRC Inactive state (Release 15)," 3GPP TS 38.304 V15.1.0, Sep. 2018, 27 pages.

* cited by examiner

METHOD AND APPARATUS FOR HANDLING A FREQUENCY PRIORITY BASED ON A SERVICE IN WIRELESS COMMUNICATION SYSTEM

CROSS-REFERENCE TO RELATED APPLICATIONS

This application is the National Stage filing under 35 U.S.C. 371 of International Application No. PCT/KR2019/016593, filed on Nov. 28, 2019, which claims the benefit of earlier filing date and right of Korean Patent Application No. 10-2018-0151864 filed on Nov. 30, 2018, the contents of which are all hereby incorporated by reference herein in their entirety.

TECHNICAL FIELD

The present disclosure relates to a method and an apparatus for handling a frequency priority based on a service in a wireless communication system.

RELATED ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Carrier aggregation with at least one secondary cell (SCell) operating in the unlicensed spectrum is referred to as licensed-assisted access (LAA). In LAA, the configured set of serving cells for a UE therefore always includes at least one SCell operating in the unlicensed spectrum according to frame structure Type 3, also called LAA SCell. Unless otherwise specified, LAA SCells act as regular SCells.

LAA eNodeB (eNB) and user equipment (UE) apply listen-before-talk (LBT) before performing a transmission on LAA SCell. When LBT is applied, the transmitter listens to/senses the channel to determine whether the channel is free or busy. If the channel is determined to be free, the transmitter may perform the transmission. Otherwise, it does not perform the transmission. If an LAA eNB uses channel access signals of other technologies for the purpose of LAA channel access, it shall continue to meet the LAA maximum energy detection threshold requirement.

SUMMARY

In NR, a wireless device may camp on a cell operated on unlicensed frequency. For initiating access to the cell on unlicensed frequency, the wireless device should succeed in LBT procedure to occupy the unlicensed channel. Since the LBT procedure may cause delayed initial access, the wireless device on unlicensed frequency may not be suitable for services that are sensitive to the delay, such as a voice call service.

Therefore, a method for supporting NR standalone operation on unlicensed frequency based on a service or a service type is required.

In an aspect, a method performed by a wireless device in a wireless communication system is provided. The wireless device camps on a serving cell operated on a first frequency. The method includes receiving, from the serving cell, a paging including an information related to a service. The method includes prioritizing or de-prioritizing the first frequency based on the information. The method includes performing cell reselection based on a priority of the first frequency.

In another aspect, a wireless device in a wireless communication system is provided. The wireless device camps on a serving cell on a first frequency. The wireless device includes a memory, a transceiver, and a processor, operably coupled to the memory and the transceiver. The processor is configured to control the transceiver to receive, from the serving cell, a paging including an information related to a service. The processor is configured to prioritize or de-prioritize the first frequency based on the information. The processor is configured to perform cell reselection based on a priority of the first frequency.

The present disclosure can have various advantageous effects.

According to some embodiments of the present disclosure, when a wireless device on an unlicensed frequency needs to establish a connection for a delay-sensitive service, the wireless device may move to licensed frequency as soon as receiving a paging message.

According to some embodiments of the present disclosure, the wireless device may reduce the delay for initial access and receive the service with lower delay via licensed frequency.

According to some embodiments of the present disclosure, a wireless device may establish a connection efficiently with a cell operated on a suitable frequency for a sensitive service.

According to some embodiments of the present disclosure, the wireless device may save an effort, such as a time and a battery, by skipping to establish a connection with a serving cell operated on an unsuitable frequency.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "I" and "," should be interpreted to indicate "and/or." For instance, the expression "A/B" may mean "A and/or B." Further, "A, B" may mean "A and/or B." Further, "AB/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
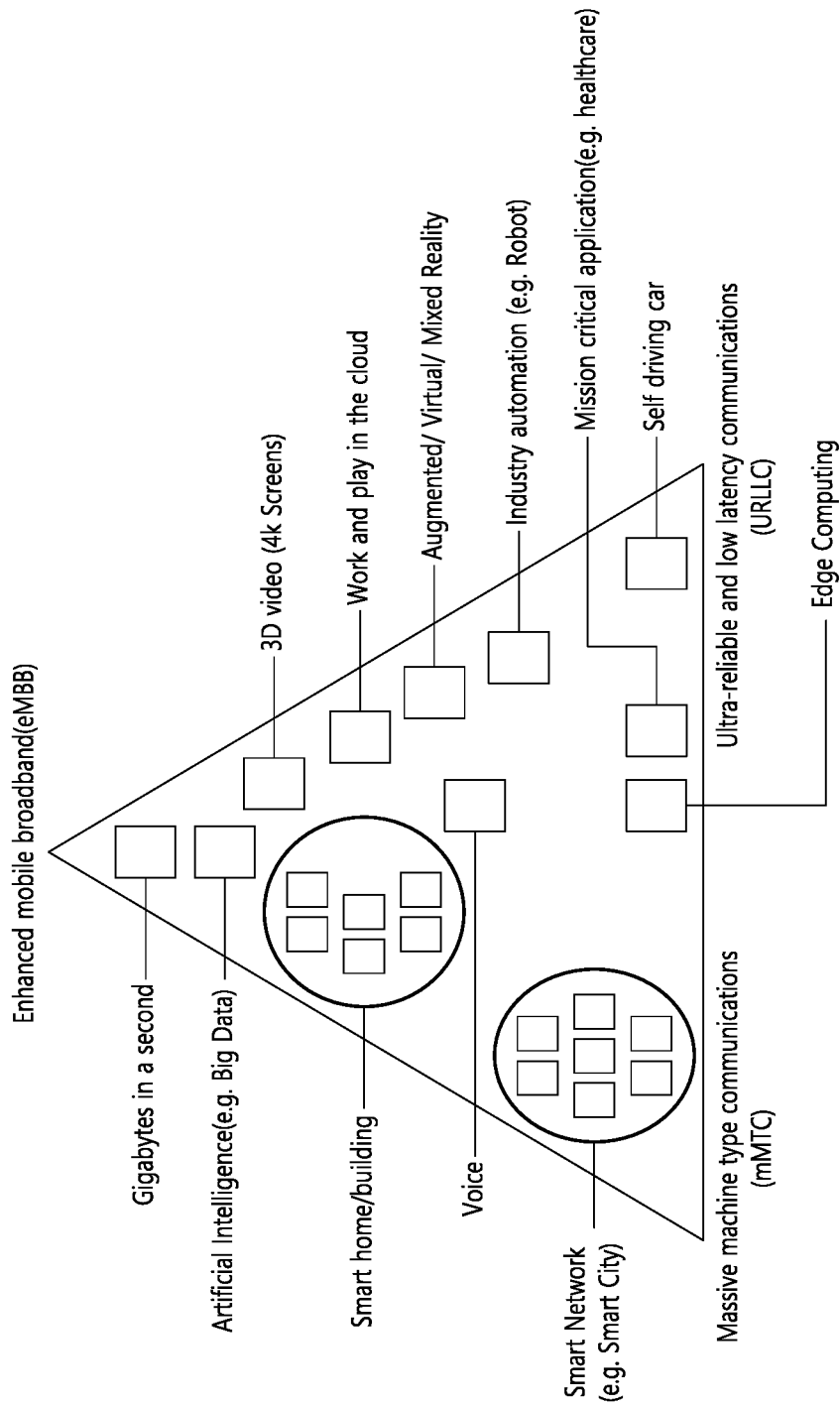
FIG. 1 shows examples of 5G usage scenarios to which the technical features of the present disclosure can be applied.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture, and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
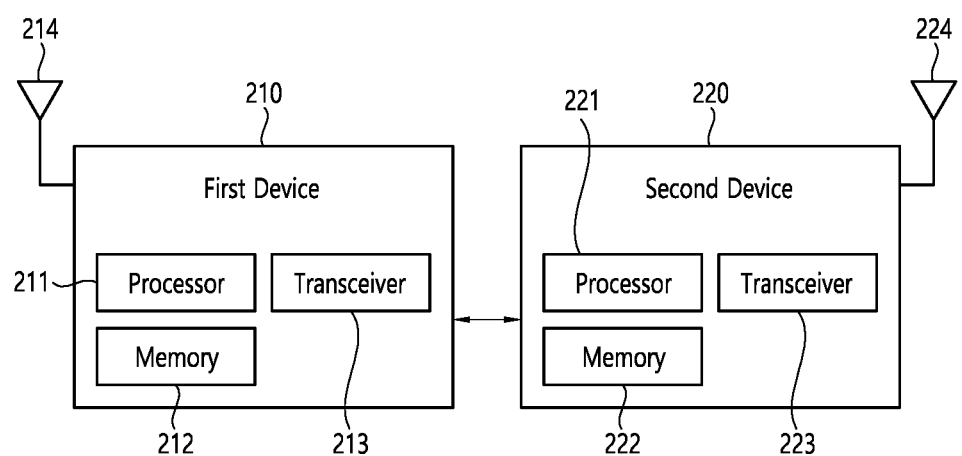
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)).

For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
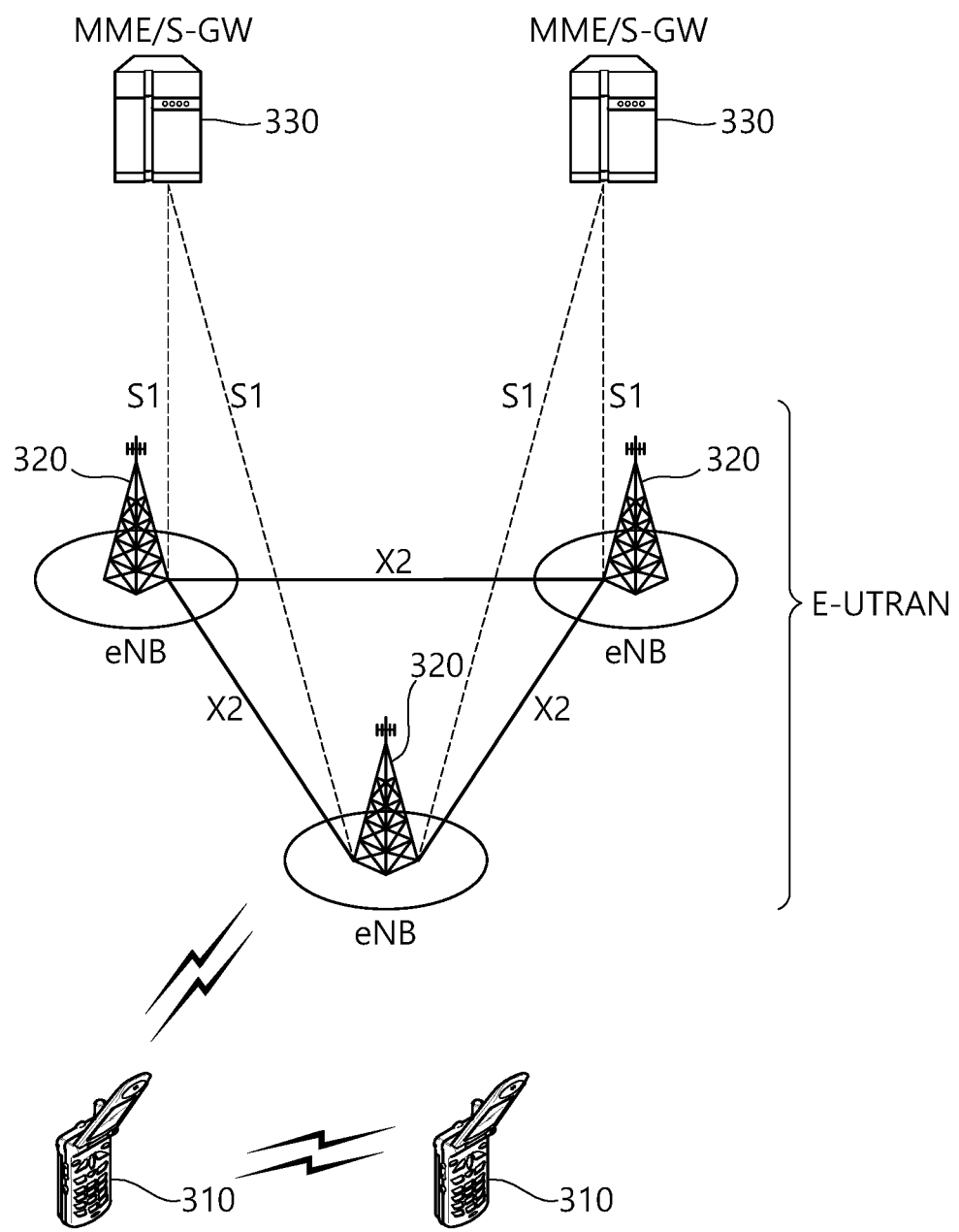
FIG. 3 shows another example of a wireless communication system to which the technical features of the present disclosure can be applied.

FIG. 3 shows another example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), and a wireless device, etc.

The E-UTRAN consists of one or more evolved NodeB (eNB) 320. The eNB 320 provides the E-UTRA user plane and control plane protocol terminations towards the UE 310. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
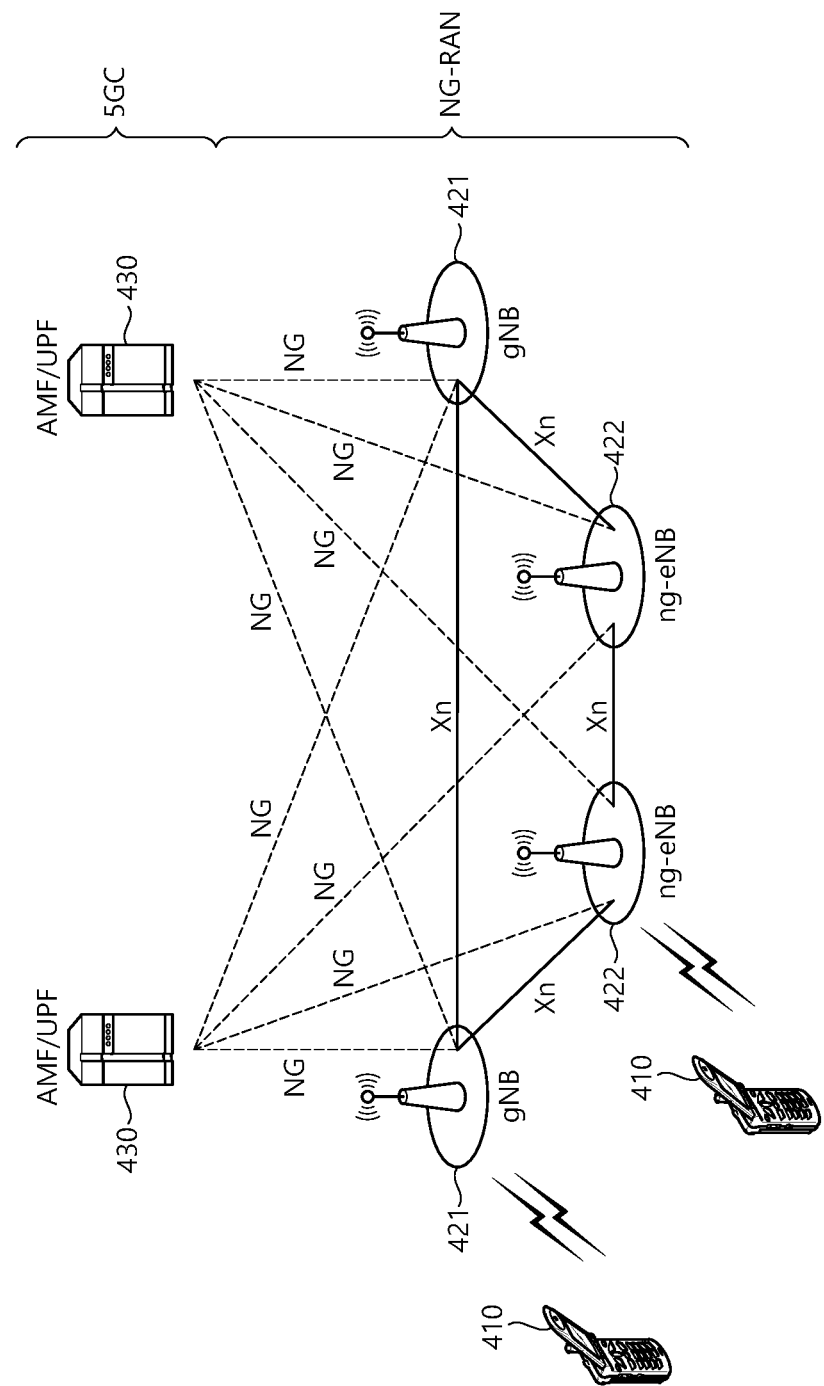
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
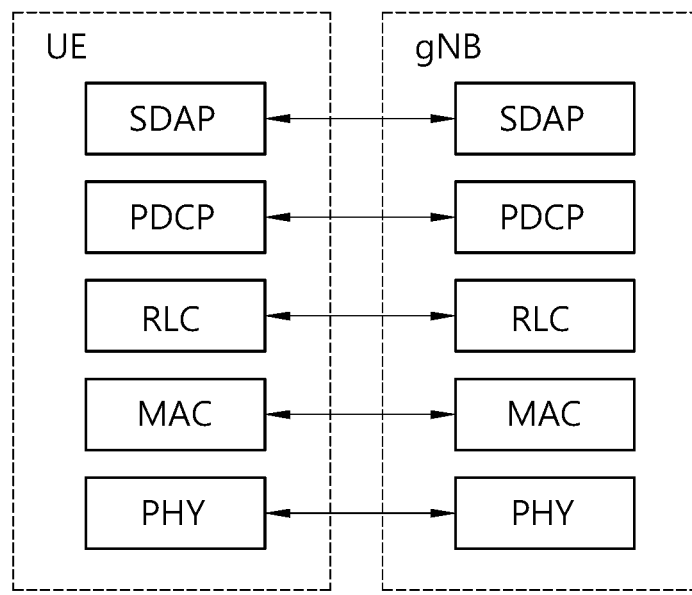
FIG. 5 shows a block diagram of a user plane protocol stack to which the technical features of the present disclosure can be applied.
Figure 6:
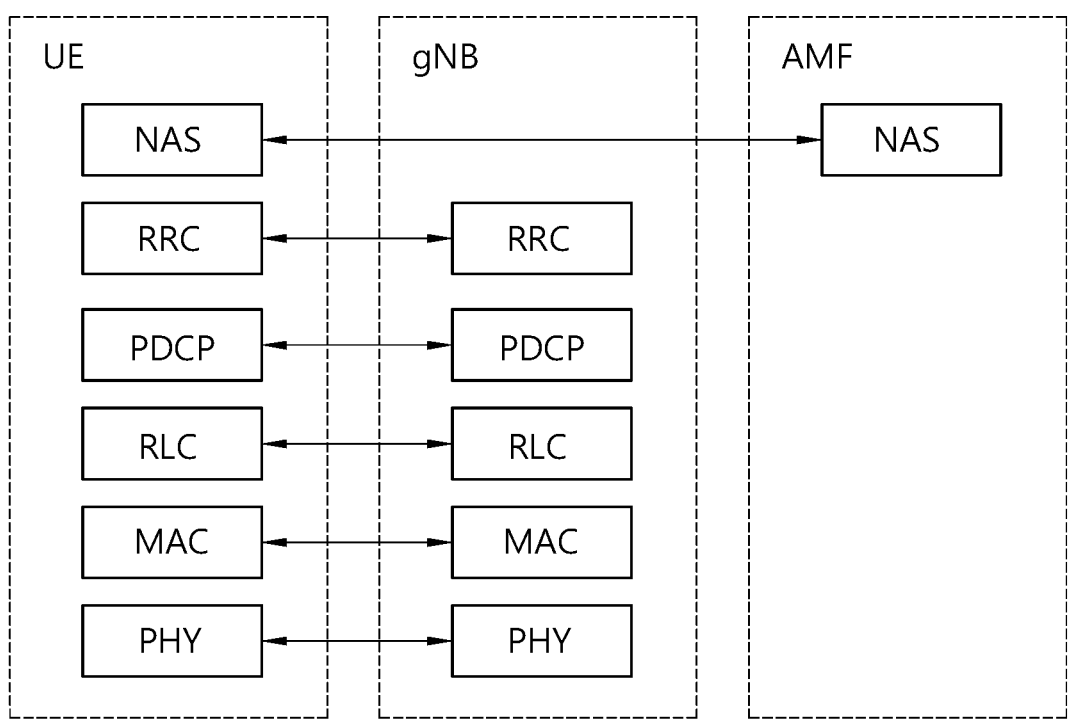
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARD), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Hereinafter, cell reselection evaluation process will be described. It may be referred to as Section 5.2.4 of 3GPP TS 38.304 V15.1.0 (2018-09). Reselection priorities handling will be described. Absolute priorities of different NR frequencies or inter-RAT frequencies may be provided to the UE in the system information, in the RRCRelease message, or by inheriting from another RAT at inter-RAT cell (re)selection. In the case of system information, an NR frequency or inter-RAT frequency may be listed without providing a priority (i.e. the field cellReselectionPriority is absent for that frequency). If priorities are provided in dedicated signalling, the UE shall ignore all the priorities provided in system information. If UE is in camped on any cell state, UE shall only apply the priorities provided by system information from current cell, and the UE preserves priorities provided by dedicated signalling and deprioritisationReq received in RRCRelease unless specified otherwise. When the UE in camped normally state, has only dedicated priorities other than for the current frequency, the UE shall consider the current frequency to be the lowest priority frequency (i.e. lower than any of the network configured values).

The UE shall only perform cell reselection evaluation for NR frequencies and inter-RAT frequencies that are given in system information and for which the UE has a priority provided.

In case UE receives RRCRelease with deprioritisationReq, UE shall consider current frequency and stored frequencies due to the previously received RRCRelease with deprioritisationReq or all the frequencies of NR to be the lowest priority frequency (i.e. lower than any of the network configured values) while T325 is running irrespective of camped RAT. The UE shall delete the stored deprioritisation request(s) when a PLMN selection is performed on request by NAS.

UE should search for a higher priority layer for cell reselection as soon as possible after the change of priority. The minimum related performance requirements are still applicable.

The UE shall delete priorities provided by dedicated signalling when:
   the UE enters a different RRC state; or
   the optional validity time of dedicated priorities (T320) expires; or
   a PLMN selection is performed on request by NAS.
   Equal priorities between RATs are not supported.

The UE shall not consider any black listed cells as candidate for cell reselection.

The UE shall inherit the priorities provided by dedicated signalling and the remaining validity time (i.e. T320 in NR and E-UTRA), if configured, at inter-RAT cell (re)selection.

The network may assign dedicated cell reselection priorities for frequencies not configured by system information.

Measurement rules for cell re-selection will be described.

When evaluating Srxlev and Squal of non-serving cells for reselection purposes, the UE shall use parameters provided by the serving cell.

Following rules are used by the UE to limit needed measurements:
   If the serving cell fulfils Srxlev>SIntraSearchP and Squal>SIntraSearchQ, the UE may choose not to perform intra-frequency measurements.
   Otherwise, the UE shall perform intra-frequency measurements.

The UE shall apply the following rules for NR inter-frequencies and inter-RAT frequencies which are indicated in system information and for which the UE has priority:
   For a NR inter-frequency or inter-RAT frequency with a reselection priority higher than the reselection priority of the current NR frequency, the UE shall perform measurements of higher priority NR inter-frequency or inter-RAT frequencies.
   For a NR inter-frequency with an equal or lower reselection priority than the reselection priority of the current NR frequency and for inter-RAT frequency with lower reselection priority than the reselection priority of the current NR frequency:
      If the serving cell fulfils Srxlev>SnonIntraSearchP and Squal>SnonIntraSearchQ, the UE may choose not to perform measurements of NR inter-frequencies or inter-RAT frequency cells of equal or lower priority;
      Otherwise, the UE shall perform measurements of NR inter-frequencies or inter-RAT frequency cells of equal or lower priority.

NR Inter-frequency and inter-RAT Cell Reselection criteria will be described. If threshServingLowQ is broadcast in system information and more than 1 second has elapsed since the UE camped on the current serving cell, cell reselection to a cell on a higher priority NR frequency or inter-RAT frequency than the serving frequency shall be performed if:
   A cell of a higher priority NR or EUTRAN RAT/frequency fulfils Squal>ThreshX, HighQ during a time interval TreselectionRAT
   Otherwise, cell reselection to a cell on a higher priority NR frequency or inter-RAT frequency than the serving frequency shall be performed if:
   A cell of a higher priority RAT/frequency fulfils Srxlev>ThreshX, HighP during a time interval TreselectionRAT; and
   More than 1 second has elapsed since the UE camped on the current serving cell.

Cell reselection to a cell on an equal priority NR frequency shall be based on ranking for intra-frequency cell reselection.

If threshServingLowQ is broadcast in system information and more than 1 second has elapsed since the UE camped on the current serving cell, cell reselection to a cell on a lower priority NR frequency or inter-RAT frequency than the serving frequency shall be performed if:

The serving cell fulfils Squal<ThreshServing, LowQ and a cell of a lower priority NR or E-UTRAN RAT/frequency fulfils Squal>ThreshX, LowQ during a time interval TreselectionRAT.

Otherwise, cell reselection to a cell on a lower priority NR frequency or inter-RAT frequency than the serving frequency shall be performed if:

The serving cell fulfils Srxlev<ThreshServing, LowP and a cell of a lower priority RAT/frequency fulfils Srxlev>ThreshX, LowP during a time interval TreselectionRAT; and More than 1 second has elapsed since the UE camped on the current serving cell.

Cell reselection to a higher priority RAT/frequency shall take precedence over a lower priority RAT/frequency if multiple cells of different priorities fulfil the cell reselection criteria.

If more than one cell meets the above criteria, the UE shall reselect a cell as follows:

If the highest-priority frequency is an NR frequency, a cell ranked as the best cell among the cells on the highest priority frequency(ies) meeting the criteria;

If the highest-priority frequency is from another RAT, a cell ranked as the best cell among the cells on the highest priority frequency(ies) meeting the criteria of that RAT.

Hereinafter, paging will be described. It may be referred to as Section 5.3.2 of 3GPP TS 38.331 V15.3.0 (2018-09).

The purpose of this procedure is to transmit paging information to a UE in RRC_IDLE or RRC_INACTIVE.

The network initiates the paging procedure by transmitting the Paging message at the UE's paging occasion. The network may address multiple UEs within a Paging message by including one PagingRecord for each UE.

Reception of the Paging message by the UE will be described.

Upon receiving the Paging message, the UE shall:
1> if in RRC_IDLE, for each of the PagingRecord, if any, included in the Paging message:
2> if the ue-Identity included in the PagingRecord matches the UE identity allocated by upper layers:
3> forward the ue-Identity and accessType (if present) to the upper layers;
1> if in RRC_INACTIVE, for each of the PagingRecord, if any, included in the Paging message:
2> if the ue-Identity included in the PagingRecord matches the UE's stored I-RNTI:
3> if the UE is configured by upper layers with access identity 1:
4> initiate the RRC connection resumption procedure with resumeCause set to MPS-PriorityAccess;
3> else if the UE is configured by upper layers with access identity 2:
4> initiate the RRC connection resumption procedure with resumeCause set to MCS-PriorityAccess;
3> else if the UE is configured by upper layers with one or more access identities equal to 11-15:
4> initiate the RRC connection resumption procedure with resumeCause set to highPriorityAccess;
3> else:
4> initiate the RRC connection resumption procedure with resumeCause set to mt-Access;
2> else if the ue-Identity included in the PagingRecord matches the UE identity allocated by upper layers:
3> forward the ue-Identity to upper layers and accessType (if present) to the upper layers;
3> perform the actions upon going to RRC_IDLE with release cause 'CN paging'.

Meanwhile, in NR standalone operation on unlicensed bands, a cell on an unlicensed bands can be considered as a PCell. That is, in NR, a wireless device may camp on a cell operated on unlicensed frequency. For a wireless device that camps on a cell operated on unlicensed frequency, if the wireless device receives paging including its identity from the cell, the wireless device will try to access the cell to establish the connection with a network.

However, to initiate access to the cell on unlicensed frequency, the wireless device should succeed in the listen before talk (LBT) procedure to occupy the unlicensed channel. Thus, the initial access to the cell on unlicensed frequency takes a much longer time compared to the cell on licensed frequency. If the service requested to the wireless device via paging is very sensitive to the delay, such delayed initial access is not desirable. Therefore, studies to prevent the delayed initial access for sensitive services are required.

Hereinafter, a method and apparatus for handling a frequency priority based on a service in a wireless communication, according to some embodiments of the present disclosure, will be described.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 7:
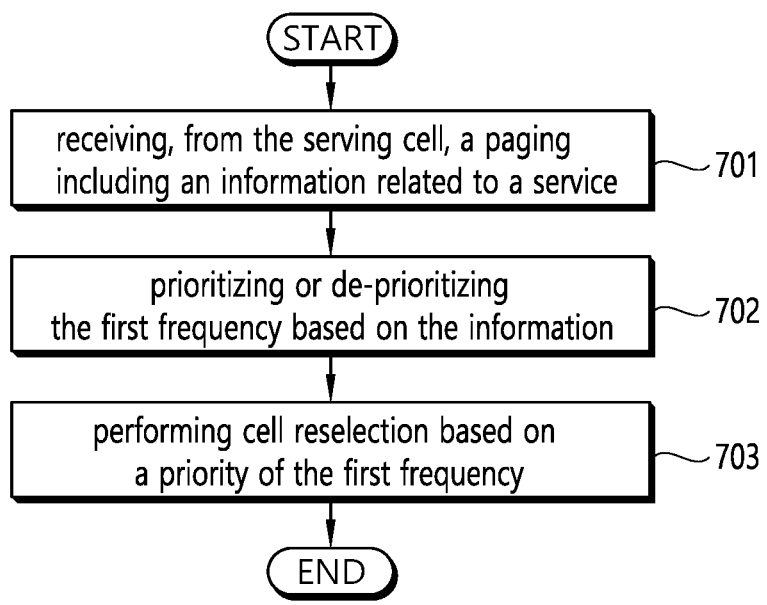
FIG. 7 shows a diagram of an example of a method for handling a frequency priority based on a service in a wireless communication system, according to some embodiments of the present disclosure.

FIG. 7 shows a diagram of an example of a method for handling a frequency priority based on a service in a wireless communication system, according to some embodiments of the present disclosure.

Referring to FIG. 7, a wireless device may camp on a serving cell operated on a first frequency. For example, the first frequency may be an unlicensed frequency.

In step 701, a wireless device may receive, from the serving cell, a paging including information related to a service.

According to some embodiments of the present disclosure, the information may include an indication which indicates whether the first frequency is suitable or not for a requested service to the wireless device. The indication may be associated with an identity (ID) of the wireless device. For example, the indication may be appended with the ID of the wireless device in the paging. For example, the indication may be '1' or '0' which means the first frequency is suitable or not for the requested service.

According to some embodiments of the present disclosure, the information may include an indication which indicates whether a frequency group is suitable or not for a requested service. The frequency group may include the first frequency. For example, the indication may represent that the frequency group (for example, frequencies in unlicensed frequency) is not suitable for a requested service.

According to some embodiments of the present disclosure, the information may include a service type indication of a requested service. The service type indication may be associated with an ID of the wireless device. For example, the service type indication may be contiguous with the ID of the wireless device in the paging. For example, the service type indication may be '00', '01', '10', or '11', which means a different type of the requested service. However, the present disclosure is not limited thereto. The service type indication may represent more than 4 service types of the requested service. For example, the service type indication may represent 8, 16 or more service types.

In step 702, a wireless device may prioritize or de-prioritize the first frequency based on the received information.

According to some embodiments of the present disclosure, a wireless device may prioritize or de-prioritize the first frequency based on an indication included in the received information. For example, a wireless device may de-prioritize the first frequency, based on that an indication indicates that the first frequency is not suitable for the service. For example, a wireless device may prioritize the first frequency, based on that the indication indicates that the first frequency is suitable for the service. For example, a wireless device may de-prioritize all frequency that belongs to a frequency group, based on that the indication indicates that the frequency group is not suitable for the service. The first frequency may be included in the frequency group. For example, a wireless device may prioritize all frequency that belongs to a frequency group, based on that the indication indicates that the frequency group is suitable for the service. The first frequency may be included in the frequency group.

According to some embodiments of the present disclosure, a wireless device may prioritize or de-prioritize the first frequency based on a service type indication included in the received information. For example, a wireless device may receive, from the serving cell, a frequency information which includes suitable service types for the first frequency. The wireless device may prioritize or de-prioritize the first frequency, based on the service type indication of the service and the suitable service types for the first frequency. In particular, the wireless device may de-prioritize the first frequency, based on that a service type indicated by the service type indication is not included in the suitable service types for the first frequency. Alternatively, the wireless device may prioritize the first frequency, based on that a service type indicated by the service type indication is included in the suitable service types for the first frequency.

According to some embodiments of the present disclosure, a wireless device may prioritize or de-prioritize other frequency different from the first frequency based on a service type indication included in the received information. For example, a wireless device may receive, from the serving cell, a frequency information which includes suitable service types for the other frequency, for example, a second frequency different from the first frequency. The wireless device may prioritize or de-prioritize the second frequency, based on the service type indication of the service and the suitable service types for the second frequency. In particular, the wireless device may de-prioritize the second frequency, based on that a service type indicated by the service type indication is not included in the suitable service types for the second frequency. Alternatively, the wireless device may prioritize the second frequency, based on that a service type indicated by the service type indication is included in the suitable service types for the second frequency.

In step 703, a wireless device may perform cell reselection based on a priority of the first frequency. For example, a wireless device may perform cell reselection based on a priority of all frequency of a frequency group. For example, a wireless device may perform cell reselection based on a priority of the first frequency and other frequency, e.g. the second frequency.

According to some embodiments of the present disclosure, a wireless device may suspend to start an initial access procedure, based on the information related to the service. The wireless device may perform cell reselection to a target cell operated on a second frequency. The wireless device may perform the initial access procedure to a second frequency, after the cell reselection to the second frequency is performed, wherein the second frequency is selected by the cell reselection.

For example, when a wireless device camps on a serving cell operated on a first frequency, which is an unlicensed frequency, and receives an information informing that a requested service is not suitable for the first frequency, the wireless device may suspend to start an initial access procedure to the first frequency, and may perform cell reselection to a target cell operated on a second frequency, which is a licensed frequency. The wireless device may perform the initial access procedure to the second frequency, after the cell reselection is performed.

According to some embodiments of the present disclosure, a wireless device may be an autonomous driving apparatus in communication with at least one of a mobile terminal, a network, and/or autonomous vehicles other than the wireless device.

Hereinafter, some embodiments for handling a frequency priority based on a service in a wireless communication, according to the present disclosure, will be described.

Embodiment 1

The embodiment 1 of the present disclosure may include the following steps.

Step 1. When UE in RRC_IDLE or RRC_INACTIVE receives a paging including its UE identity from a network, the UE may receive and check an indicator associated with its UE identity, which indicates which frequency or frequency group is suitable or not suitable for the requested service to the UE.

The indicator may be included in the paging message.

Step 2*a* (option 1). If the indicator associated with its UE identity indicates that a certain frequency and/or frequency group is not suitable for the requested service to the UE, the UE may de-prioritize the frequency priority for the frequency and/or all frequencies that belong to the frequency group than other frequency and/or frequency group.

For example, UE may consider all frequencies that belong to a certain frequency group to be the lowest priority frequency (i.e. lower than any of the network configured values).

For example, if the indicator indicates that the requested service is not suitable for unlicensed frequency, the UE may consider all unlicensed frequencies to be the lowest priority frequency.

For example, if the indicator indicates that the requested service is not suitable for unlicensed frequency, the UE may consider all unlicensed frequencies to be the lower priority frequency than licensed frequency.

Step 2*b* (option 2). If the indicator associated with its UE identity indicates that a certain frequency group is suitable for the requested service to the UE, the UE may prioritize the frequency priority for all serving and/or neighbor frequencies that belong to the certain frequency group than other frequency and/or frequency group.

For example, UE may consider all frequencies that belong to the certain frequency group to be the highest priority frequency (i.e. higher than any of the network configured values).

For example, if the indicator indicates that the requested service is suitable for licensed frequency, the UE may consider all licensed frequencies to be the highest priority frequency.

For example, if the indicator indicates that the requested service is suitable for licensed frequency, the UE may consider all licensed frequencies to be the higher priority frequency than unlicensed frequency.

Step 3. The UE may perform cell reselection procedure based on the modified frequency priorities.

Step 4. The UE may re-select and camp on a cell operated on a suitable frequency for the requested service to the UE.

Step 5. The UE may receive or transmit the requested service via a suitable frequency for the service.

An example of a method for handling a frequency priority based on a service in a wireless communication, according to the embodiment 1 of the present disclosure, will be descried.

In this example, a UE may camp on a cell operated on an unlicensed frequency.

Step 1. When the UE receives a paging including its UE identity from a network, the UE may receive an indicator associated with its UE identity, which indicates whether the requested service to the UE is delay-sensitive or not, i.e. whether the service is suitable to be serviced via unlicensed frequency or not.

Step 2. If the indicator associated with its UE identity indicates that the requested service is not suitable for unlicensed frequency, i.e. the requested service is suitable only for licensed frequency, the UE may de-prioritize the frequency priority for all unlicensed frequencies, including serving frequency.

For example, UE may consider all unlicensed frequencies to be the lowest priority frequency (i.e. lower than any of the network configured values).

Step 3. The UE may perform the cell reselection procedure based on the modified frequency priorities.

Step 4. The UE may re-select and camp on a cell on an unlicensed frequency.

Step 5. The UE may receive and transmit the requested service via the unlicensed frequency.

Figure 8:
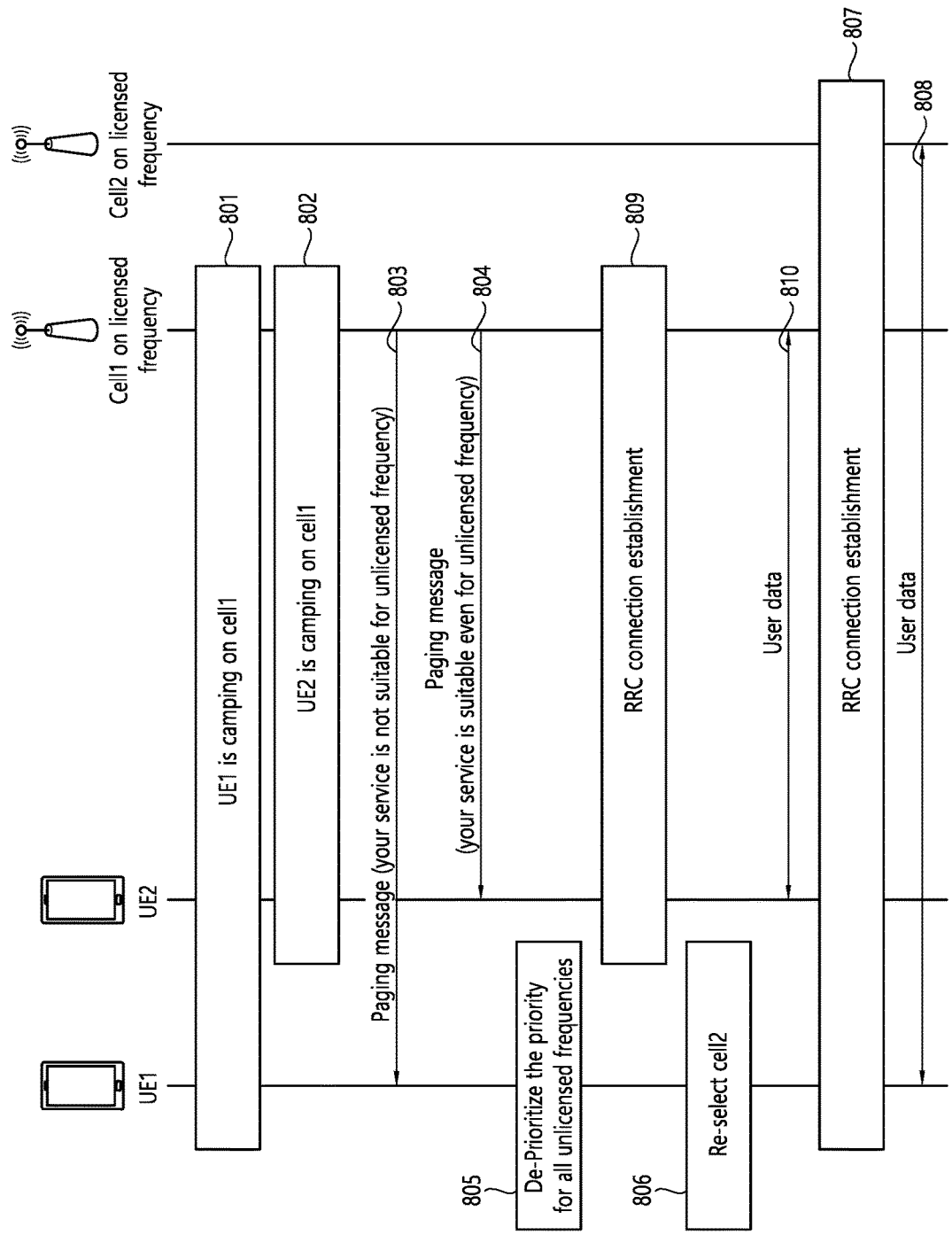
FIG. 8 shows an example of a method for handling a frequency priority based on a service in a wireless communication, according to the embodiment 1 of the present disclosure.

FIG. 8 shows an example of a method for handling a frequency priority based on a service in a wireless communication, according to the embodiment 1 of the present disclosure.

In step 801, a UE1 may camp on a first cell (cell1), which is operated on unlicensed frequency.

In step 802, a UE2 may camp on a first cell, which is operated on unlicensed frequency.

In step 803, the UE1 may receive a paging message from the first cell.

In step 804, the UE2 may receive a paging message from the first cell.

For example, in steps 803 and 804, the UE1 and the UE2 may receive the same paging message which includes both of a UE1 ID and a UE2 ID. The paging message may include a first indication associated with the UE1 which indicates that a service for the UE1 is not suitable for unlicensed frequency. The paging message may also include a second indication associated with the UE2 which indicates that a service for the UE2 is suitable even for unlicensed frequency.

In step 805, the UE1 may de-prioritize the frequency priority for all unlicensed frequencies including serving unlicensed frequency.

In step 806, the UE 1 may perform cell reselection procedure and select a second cell (cell2) operated on a licensed frequency. The UE1 may camp on the second cell.

In step 807, the UE1 may perform the RRC connection establishment procedure to the second cell.

In step 808, the UE1 may receive user data from the second cell or transmit user data to the second cell.

The UE2 may not need to de-prioritize the frequency priority because the requested service is suitable even for unlicensed frequency.

Therefore, in step 809, the UE2 may perform the RRC connection establishment procedure with the first cell.

In step 810, the UE2 may receive user data from the first cell or transmit user data to the first cell.

In the FIG. 8, it is described that step 809 is performed before step 807. However, the present disclosure is not limited thereto. For example, step 809 may be performed after step 807. In step 809, the UE2 may perform the LBT process to perform the RRC connection establishment procedure, since the first cell is operated on an unlicensed frequency. Although the UE1 and the UE2 receive the same paging message in steps 803 and 804, the UE1 could establish the RRC connection with the second cell (step 807) before that the UE2 establishes the RRC connection with the first cell (step 809).

Embodiment 2

The embodiment 2 of the present disclosure may include the following steps.

For the embodiment 2 of the present disclosure, according to some embodiments of the present disclosure, before receiving the paging message, a UE may receive a frequency group information from serving cell via common configuration, e.g. system information, or dedicated configuration. The frequency group information may include which frequency is suitable for each service or service type.

Step 1. When UE in RRC_IDLE or RRC_INACTIVE receives a paging including its UE identity from a network, the UE may receive and check a service type indication associated with its UE identity.

The service type indication may be included in the paging message.

Step 2a (option 1). The UE may de-prioritize the frequency priority for all serving and/or neighbor frequencies that is not suitable for the service type associated with its UE identity based on the service type indication.

For example, a UE may determine whether a serving frequency and/or neighboring frequencies are suitable or not for the service, respectively. In particular, a UE may determine that a serving frequency and/or neighboring frequencies are not suitable for a requested service based on that a service type indicated by the service type indication is not included in the suitable service types for the serving frequency and/or the neighboring frequencies, respectively.

According to some embodiments of the present disclosure, a UE may consider all frequencies that is not suitable for the service type to be the lowest priority frequency (i.e. lower than any of the network configured values) based on the determination.

According to some embodiments of the present disclosure, when a UE determines that the requested service is not suitable for unlicensed frequency, the UE may consider all unlicensed frequencies to be the lowest priority frequency.

According to some embodiments of the present disclosure, when a UE determines that the requested service is not suitable for unlicensed frequency, the UE may consider all unlicensed frequencies to be the lower priority frequency than licensed frequency.

Step 2b (option 2). The UE may prioritize the frequency priority for all serving and/or neighbor frequencies that is suitable for the service type associated with its UE identity based on the service type indication.

For example, a UE may determine whether a serving frequency and/or neighboring frequencies are suitable or not for the service, respectively. In particular, a UE may determine that a serving frequency and/or neighboring frequencies are suitable for a requested service based on that a service type indicated by the service type indication is included in the suitable service types for the serving frequency and/or the neighboring frequencies, respectively.

According to some embodiments of the present disclosure, UE may consider all serving and/or neighbor frequencies that is suitable for the service type to be the highest priority frequency (i.e. higher than any of the network configured values) based on the determination.

According to some embodiments of the present disclosure, when a UE determines that the requested service is suitable for licensed frequency, the UE may consider all licensed frequencies to be the highest priority frequency.

According to some embodiments of the present disclosure, when a UE determines that the requested service is suitable for licensed frequency, the UE may consider all licensed frequencies to be the higher priority frequency than unlicensed frequency.

Step 3. The UE may perform a cell reselection procedure based on the modified frequency priorities.

Step 4. The UE may re-select and camp on a cell operated on a suitable frequency for the requested service to the UE.

Step 5. The UE may receive or transmit the requested service via a suitable frequency for the service.

Embodiment 3

The embodiment 3 of the present disclosure may include the following steps.

Step 1. When UE in RRC_IDLE or RRC_INACTIVE is about to start data transmission by request from the NAS layer, the RRC in UE may acquire service type from the NAS layer and determine whether which frequency is suitable for the service.

Step 2a (option 1). The UE may de-prioritize the frequency priority for all serving and/or neighbor frequencies that is not suitable for the service type associated.

For example, UE may consider all frequencies that are not suitable for the service type to be the lowest priority frequency (i.e. lower than any of the network configured values).

For example, if the service is not suitable for unlicensed frequency, the UE may consider all unlicensed frequencies to be the lowest priority frequency.

For example, if the service is not suitable for unlicensed frequency, the UE may consider all unlicensed frequencies to be the lower priority frequency than licensed frequency.

Step 2b (option 2). The UE may prioritize the frequency priority for all serving and/or neighbor frequencies that is suitable for the service type.

For example, UE may consider all serving and/or neighbor frequencies that is suitable for the service type to be the highest priority frequency (i.e. higher than any of the network configured values).

For example, if the service is suitable for licensed frequency, the UE may consider all licensed frequencies to be the highest priority frequency.

For example, if the service is suitable for licensed frequency, the UE may consider all licensed frequencies to be the higher priority frequency than unlicensed frequency.

Step 3. The UE may perform a cell reselection procedure based on the modified frequency priorities.

Step 4. The UE may re-select and camp on a cell operated on a suitable frequency for the requested service to the UE.

Step 5. The UE may receive and/or transmit the requested service via a suitable frequency for the service.

According to some embodiments of the present disclosure, when a UE is in RRC_IDLE and receives the paging message, the UE may perform the RRC connection establishment procedure before receiving the requested service from a network if the state transition to RRC_CONNECTED is necessary to receive the service.

According to some embodiments of the present disclosure, when a UE is in RRC_INACTIVE and receives the paging message, the UE may perform RRC connection resume procedure before receiving the requested service from a network if the state transition to RRC_CONNECTED is necessary to receive the service.

According to some embodiments of the present disclosure, the UE may initiate the connection establishment or resume procedure before re-selecting a cell operated on a suitable frequency for the requested service. However, in most cases, though the UE initiates the connection establishment or resume procedure before cell re-selection, the UE may re-select a cell operated on a suitable frequency before the connection establishment or resume procedure is complete.

According to some embodiments of the present disclosure, if the indicator associated identity of a UE in paging indicates that the requested service for the UE is not suitable for current serving frequency, the UE may not start initial access, e.g. RACH procedure or connection establishment or resume procedure, until the cell reselection to a suitable cell (i.e., a cell on a frequency suitable for the service) is complete. For example, though the UE completes the constructing of RRC message for connection establishment or resume, the UE may not submit the message to lower layers until the cell reselection to a suitable cell is complete. The UE may submit the RRC message to lower layers for transmission only after cell reselection to the suitable cell is complete.

According to some embodiments of the present disclosure, although the indicator associated identity of a UE in paging indicates that the requested service for the UE is not suitable for a cell operated on a current serving frequency, the UE may start initial access (e.g. RACH procedure or connection establishment or resume procedure) with the current serving frequency, while the UE performs the cell reselection procedure. If the UE finishes the initial access with the current serving cell before the cell reselection procedure, the UE may transmit or receive user data via the current serving frequency. In this case, the UE may handover to a target cell operated on a suitable frequency.

Figure 9:
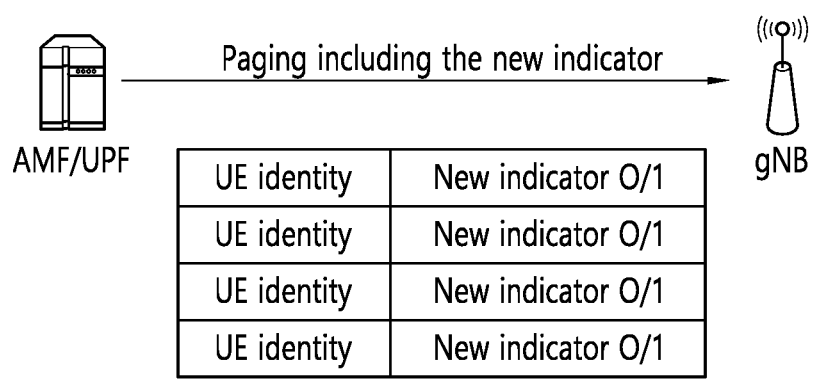
FIG. 9 and FIG. 10 show an example of network behaviors in a wireless communication, according to some embodiments of the present disclosure.
Figure 10:
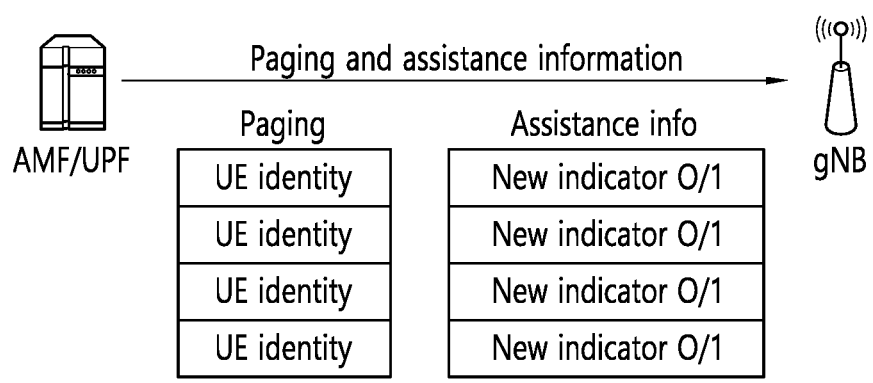

FIG. 9 and FIG. 10 show an example of network behaviors in a wireless communication, according to some embodiments of the present disclosure.

For the convenience, it is exemplarily described that the network behaviors are associated with the embodiment 1 of the present disclosure. However, the present disclosure is not limited thereto. The network behaviors may be associated with the embodiment 2 of the present disclosure.

Network Behavior 1

Referring to FIG. 9, a core network node (for example, an Access and Mobility Management Function (AMF) or a User Plane Function (UPF)) may transmit, to a base station (for example, a gNB), a paging including a new indicator. For example, an AMF may construct the paging message to include a new indicator per UE. The new indicator may be associated with a UE identity, and indicate which frequency and/or frequency group is suitable or not suitable for the requested service to the UE. For example, the new indicator may be an indicator described in the embodiment 1 above or a service type indication in the embodiments 2 above. The base station (for example, a gNB) may just convey, to a UE(s), the paging message which is constructed by AMF.

Network Behavior 2

Referring to FIG. 10, a core network node (for example, an AMF or a UPF) may transmit, to a base station (for example, a gNB), a paging and assistance information. For example, an AMF may construct the paging without the new indicator. Independently, the AMF may provide assistance information to gNB. In this case, the gNB may add a new indicator to the paging message. The gNB may include the new indicator in paging message based on assistance information received from AMF. For example, the new indicator may be an indicator described in the embodiment 1 above or a service type indication in the embodiments 2 above.

According to some embodiments of the present disclosure, the RAN paging may be initiated by RAN, i.e. gNB. When RAN node constructs the RAN paging message, the paging message may include a new indicator above per UE.

For example, the new indicator associated with the UE identity may indicate which frequency and/or frequency group is suitable or not suitable for the requested service of the UE. For example, the new indicator may inform whether a requested service to the UE is delay sensitive or not. For example, the new indicator may inform whether the service is suitable to be serviced via unlicensed frequency or not.

For other example, the new indicator associated with the UE identity may include the service type indicator for the requested service of the UE. The UE may determine which frequency and/or frequency group is suitable or not suitable for the requested service of the UE.

According to some embodiments of the present disclosure, a certain type of frequency may not be suitable for a certain type of service. For example, the unlicensed frequency may not be suitable to support voice call service, because the LBT procedure should be done first before transmitting user data. Therefore, when a wireless device on unlicensed frequency needs to establish a connection to receive a delay-sensitive service, the wireless device can move to licensed frequency as soon as it receives a paging message. Therefore, the wireless device may reduce the delay for initial access and receive the service with lower delay via licensed frequency.

According to some embodiments of the present disclosure, a wireless device may establish a connection efficiently with a target cell operated on a suitable frequency for a requested service. The wireless device may also save an effort, such as a time and a battery, by skipping to establish a connection with a serving cell operated on an unsuitable frequency.

In the present disclosure, some embodiments which are described above can be combined with each other. For example, the embodiments described above could be combined with each other.

Figure 11:
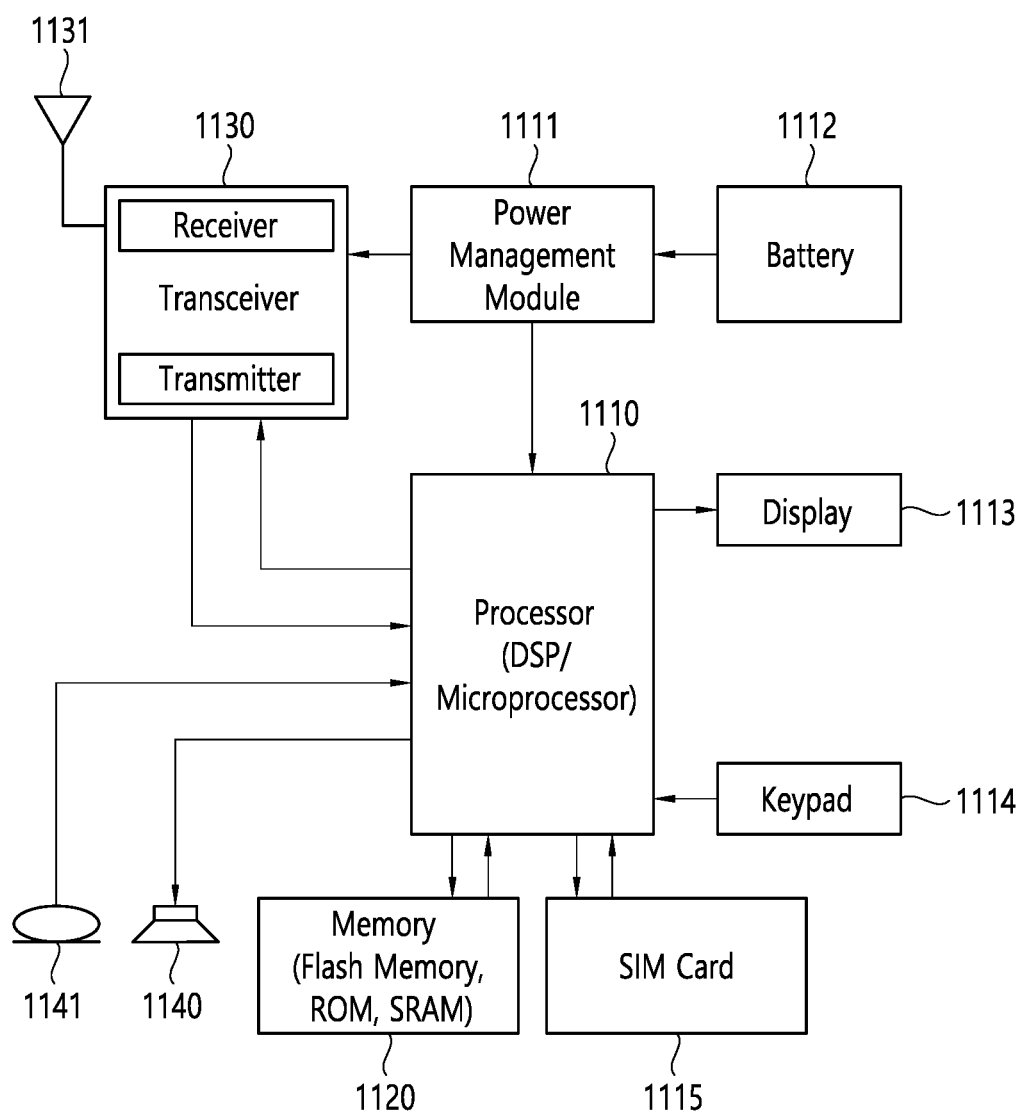
FIG. 11 shows an apparatus to which the technical features of the present disclosure can be applied. The description of the same or similar features described above could be omitted or simplified, for convenience of explanation.

FIG. 11 shows an apparatus to which the technical features of the present disclosure can be applied. The description of the same or similar features described above could be omitted or simplified, for convenience of explanation.

An apparatus may be referred to as a wireless device, such as a user equipment (UE), an Integrated Access and Backhaul (IAB), or etc.

A wireless device includes a processor 1110, a power management module 1111, a battery 1112, a display 1113, a keypad 1114, a subscriber identification module (SIM) card 1115, a memory 1120, a transceiver 1130, one or more antennas 1131, a speaker 1140, and a microphone 1141.

The processor 1110 may be configured to implement proposed functions, procedures and/or methods described in this description. Layers of the radio interface protocol may be implemented in the processor 1110. The processor 1110 may include application-specific integrated circuit (ASIC), other chipset, logic circuit and/or data processing device. The processor 1110 may be an application processor (AP). The processor 1110 may include at least one of a digital signal processor (DSP), a central processing unit (CPU), a graphics processing unit (GPU), a modem (modulator and demodulator). An example of the processor 1110 may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The power management module 1111 manages power for the processor 1110 and/or the transceiver 1130. The battery 1112 supplies power to the power management module 1111. The display 1113 outputs results processed by the processor 1110. The keypad 1114 receives inputs to be used by the processor 1110. The keypad 1114 may be shown on the display 1113. The SIM card 1115 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1120 is operatively coupled with the processor 1110 and stores a variety of information to operate the processor 1110. The memory 1120 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1120 and executed by the processor 1110. The memory 1120 can be implemented within the processor 1110 or external to the processor 1110 in which case those can be communicatively coupled to the processor 1110 via various means as is known in the art.

The transceiver 1130 is operatively coupled with the processor 1110, and transmits and/or receives a radio signal. The transceiver 1130 includes a transmitter and a receiver. The transceiver 1130 may include baseband circuitry to process radio frequency signals. The transceiver 1130 controls the one or more antennas 1131 to transmit and/or receive a radio signal.

The speaker 1140 outputs sound-related results processed by the processor 1110. The microphone 1141 receives sound-related inputs to be used by the processor 1110.

According to some embodiments of the present disclosure, the processor 1110 may be configured to be coupled operably with the memory 1120 and the transceiver 1130.

The processor 1110 may be configured to control the transceiver 1130 to receive, from the serving cell, a paging including an information related to a service. The processor 1110 may be configured to prioritize or de-prioritize the first frequency based on the information. The processor 1110 may be configured to perform cell reselection based on a priority of the first frequency. For example, the information may include an indication which indicates whether the first frequency is suitable or not for the service. For example, the information may include a service type indication of the service, wherein the service type indication is associated with an ID of the wireless device.

According to some embodiments of the present disclosure, a wireless device may reduce a delay for establishing a connection with a cell operated on an unsuitable frequency for a requested service to the wireless device.

According to some embodiments of the present disclosure, a wireless device may establish a connection efficiently with a cell operated on a suitable frequency for a requested service to the wireless device.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

<Robot>

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

<Autonomous-Driving/Self-Driving>

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

<XR>

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

Figure 12:
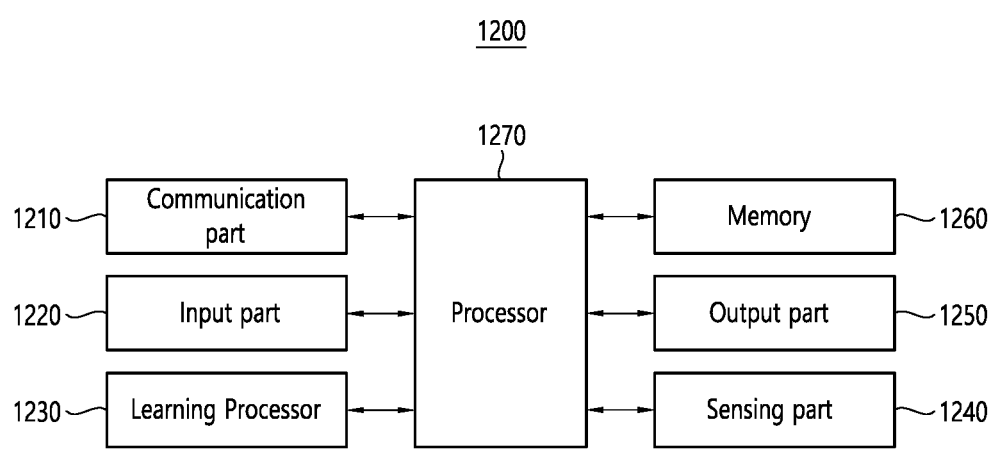
FIG. 12 shows an example of an AI device to which the technical features of the present disclosure can be applied.

FIG. 12 shows an example of an AI device to which the technical features of the present disclosure can be applied.

The AI device 1200 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 12, the AI device 1200 may include a communication part 1210, an input part 1220, a learning processor 1230, a sensing part 1240, an output part 1250, a memory 1260, and a processor 1270.

The communication part 1210 can transmit and/or receive data to and/or from external devices such as the AI devices and the AI server using wire and/or wireless communication technology. For example, the communication part 1210 can transmit and/or receive sensor information, a user input, a learning model, and a control signal with external devices. The communication technology used by the communication part 1210 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1220 can acquire various kinds of data. The input part 1220 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1220 can acquire input data to be used when acquiring an output using learning data and a learning model for model learning. The input part 1220 may obtain raw input data, in which case the processor 1270 or the learning processor 1230 may extract input features by preprocessing the input data.

The learning processor 1230 may learn a model composed of an ANN using learning data. The learned ANN can be referred to as a learning model. The learning model can be used to infer result values for new input data rather than learning data, and the inferred values can be used as a basis for determining which actions to perform. The learning processor 1230 may perform AI processing together with the learning processor of the AI server. The learning processor 1230 may include a memory integrated and/or implemented in the AI device 1200. Alternatively, the learning processor 1230 may be implemented using the memory 1260, an external memory directly coupled to the AI device 1200, and/or a memory maintained in an external device.

The sensing part 1240 may acquire at least one of internal information of the AI device 1200, environment information of the AI device 1200, and/or the user information using various sensors. The sensors included in the sensing part 1240 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1250 may generate an output related to visual, auditory, tactile, etc. The output part 1250 may include a display for outputting visual information, a speaker for outputting auditory information, and/or a haptic module for outputting tactile information.

The memory 1260 may store data that supports various functions of the AI device 1200. For example, the memory 1260 may store input data acquired by the input part 1220, learning data, a learning model, a learning history, etc.

The processor 1270 may determine at least one executable operation of the AI device 1200 based on information determined and/or generated using a data analysis algorithm and/or a machine learning algorithm. The processor 1270 may then control the components of the AI device 1200 to perform the determined operation. The processor 1270 may request, retrieve, receive, and/or utilize data in the learning processor 1230 and/or the memory 1260, and may control the components of the AI device 1200 to execute the predicted operation and/or the operation determined to be desirable among the at least one executable operation. The processor 1270 may generate a control signal for controlling the external device, and may transmit the generated control signal to the external device, when the external device needs to be linked to perform the determined operation. The processor 1270 may obtain the intention information for the user input and determine the user's requirements based on the obtained intention information. The processor 1270 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1230 and/or learned by the learning processor of the AI server, and/or learned by their distributed processing. The processor 1270 may collect history information including the operation contents of the AI device 1200 and/or the user's feedback on the operation, etc. The processor 1270 may store the collected history information in the memory 1260 and/or the learning processor 1230, and/or transmit to an external device such as the AI server. The collected history information can be used to update the learning model. The processor 1270 may control at least some of the components of AI device 1200 to drive an application program stored in memory 1260. Furthermore, the processor 1270 may operate two or more of the components included in the AI device 1200 in combination with each other for driving the application program.

Figure 13:
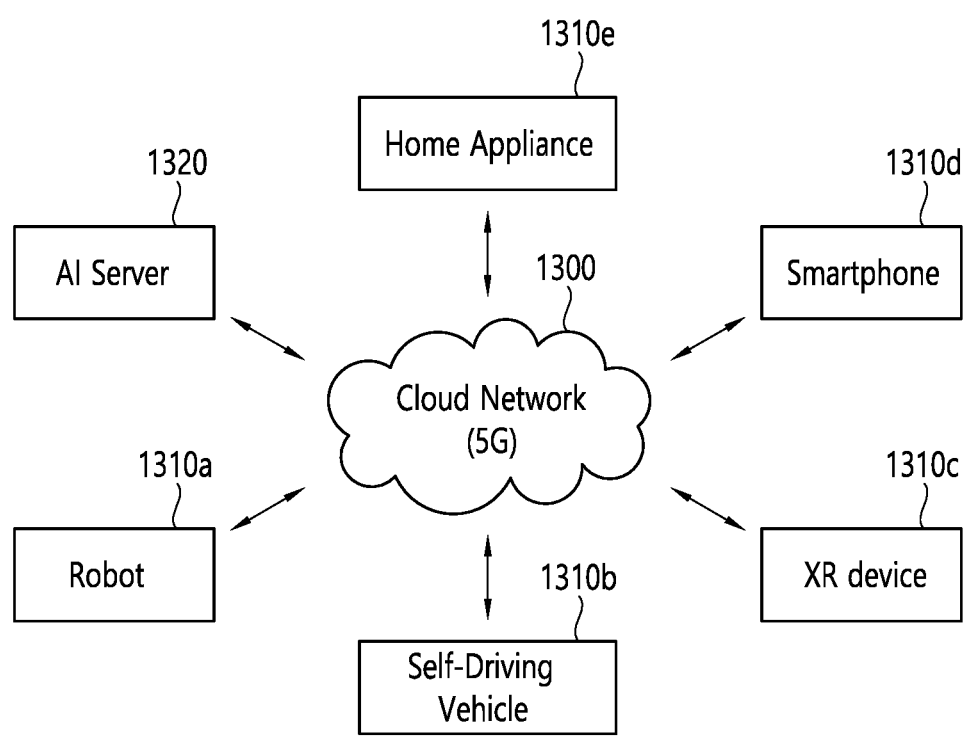
FIG. 13 shows an example of an AI system to which the technical features of the present disclosure can be applied.

FIG. 13 shows an example of an AI system to which the technical features of the present disclosure can be applied.

Referring to FIG. 13, in the AI system, at least one of an AI server 1320, a robot 1310*a*, an autonomous vehicle 1310*b*, an XR device 1310*c*, a smartphone 1310*d* and/or a home appliance 1310*e* is connected to a cloud network 1300. The robot 1310*a*, the autonomous vehicle 1310*b*, the XR device 1310*c*, the smartphone 1310*d*, and/or the home appliance 1310*e* to which the AI technology is applied may be referred to as AI devices 1310*a* to 1310*e*.

The cloud network 1300 may refer to a network that forms part of a cloud computing infrastructure and/or resides in a cloud computing infrastructure. The cloud network 1300 may be configured using a 3G network, a 4G or LTE network, and/or a 5G network. That is, each of the devices 1310*a* to 1310*e* and 1320 consisting the AI system may be connected to each other through the cloud network 1300. In particular, each of the devices 1310*a* to 1310*e* and 1320 may communicate with each other through a base station, but may directly communicate with each other without using a base station.

The AI server 1320 may include a server for performing AI processing and a server for performing operations on big data. The AI server 1320 is connected to at least one or more of AI devices constituting the AI system, i.e. the robot 1310*a*, the autonomous vehicle 1310*b*, the XR device 1310*c*, the smartphone 1310*d* and/or the home appliance 1310*e* through the cloud network 1300, and may assist at least some AI processing of the connected AI devices 1310*a* to 1310*e*. The AI server 1320 can learn the ANN according to the machine learning algorithm on behalf of the AI devices 1310*a* to 1310*e*, and can directly store the learning models and/or transmit them to the AI devices 1310*a* to 1310*e*. The AI server 1320 may receive the input data from the AI devices 1310*a* to 1310*e*, infer the result value with respect to the received input data using the learning model, generate a response and/or a control command based on the inferred result value, and transmit the generated data to the AI devices 1310*a* to 1310*e*. Alternatively, the AI devices

1310*a* to 1310*e* may directly infer a result value for the input data using a learning model, and generate a response and/or a control command based on the inferred result value.

Various embodiments of the AI devices 1310*a* to 1310*e* to which the technical features of the present disclosure can be applied will be described. The AI devices 1310*a* to 1310*e* shown in FIG. 13 can be seen as specific embodiments of the AI device 1200 shown in FIG. 12.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:
    camping on a first cell operated on an unlicensed frequency;
    receiving, from the first cell, a paging including an indicator informing that a requested service is not suitable for the unlicensed frequency;
    upon receiving the paging:
        constructing a radio resource control (RRC) message for an RRC connection establishment procedure or an RRC connection resume procedure;
        and after constructing the RRC message, initiating a cell reselection procedure to select a second cell; and
    transmitting, to the second cell, the constructed RRC message after completing the cell reselection procedure,
    wherein the cell reselection procedure comprises:
    (1) de-prioritizing all unlicensed frequencies to be a lowest priority frequencies, upon receiving the indicator;
    (2) selecting the second cell operated on a licensed frequency by considering the de-prioritized unlicensed frequencies; and
    (3) camping on the second cell.

2. The method of claim 1, wherein the indicator is associated with an identity (ID) of the wireless device.

3. The method of claim 1, wherein the paging further includes a service type indication for the requested service.

4. The method of claim 3, wherein the method further comprises:
    receiving frequency information which includes suitable service types for the unlicensed frequency.

5. The method of claim 1, wherein the method further comprises:
    suspending to transmit the constructed RRC message based on the indicator included in the paging.

6. The method of claim 1, wherein the wireless device is an autonomous driving apparatus in communication with at least one of a mobile terminal, a network, and/or autonomous vehicles other than the wireless device.

7. A wireless device in a wireless communication system, the wireless device comprising:
    a memory;
    a transceiver; and
    a processor, operably coupled to the memory and the transceiver, and configured to:
    camp on a first cell operated on an unlicensed frequency;
    receive, from the first cell, a paging including an indicator informing that a requested service is not suitable for the unlicensed frequency;
    upon receiving the paging:
        construct a radio resource control (RRC) message for an RRC connection establishment procedure or an RRC connection resume procedure;
        and after constructing the RRC message, initiate a cell reselection procedure to select a second cell; and
    transmit, to the second cell, the constructed RRC message after completing the cell reselection procedure,
    wherein, in the cell reselection procedure, the processor is further configured to:
    (1) de-prioritize all unlicensed frequencies to be a lowest priority frequencies, upon receiving the indicator;
    (2) select the second cell operated on a licensed frequency by considering the de-prioritized unlicensed frequencies; and
    (3) camp on the second cell.

8. A processor for a wireless device in a wireless communication system, wherein the processor is configured to control the wireless device to perform operations comprising:
    camping on a first cell operated on an unlicensed frequency;
    receiving, from the first cell, a paging including an indicator informing that a requested service is not suitable for the unlicensed frequency;
    upon receiving the paging:
        constructing a radio resource control (RRC) message for an RRC connection establishment procedure or an RRC connection resume procedure;
        and after constructing the RRC message, initiating a cell reselection procedure to select a second cell; and
    transmitting, to the second cell, the constructed RRC message after completing the cell reselection procedure,
    wherein the cell reselection procedure comprises:
    (1) de-prioritizing all unlicensed frequencies to be a lowest priority frequencies, upon receiving the indication;
    (2) selecting the second cell operated on a licensed frequency by considering the de-prioritized unlicensed frequencies; and
    (3) camping on the second cell.

\* \* \* \* \*